(12) United States Patent
Jun et al.

(10) Patent No.: US 9,266,049 B2
(45) Date of Patent: Feb. 23, 2016

(54) AIR-CONDITIONER AND CONTROLLING METHOD THEREOF

(71) Applicant: LG ELECTRONICS INC., Seoul (KR)

(72) Inventors: Jihoon Jun, Seoul (KR); Dongkeun Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/164,504

(22) Filed: Jan. 27, 2014

(65) Prior Publication Data

US 2014/0216251 A1 Aug. 7, 2014

(30) Foreign Application Priority Data

Feb. 5, 2013 (KR) .................. 10-2013-0012676

(51) Int. Cl.
*B01D 46/00* (2006.01)
*F24F 1/00* (2011.01)
*F24F 3/16* (2006.01)
*F24F 13/28* (2006.01)

(52) U.S. Cl.
CPC .......... *B01D 46/0076* (2013.01); *F24F 1/0007* (2013.01); *F24F 3/1603* (2013.01); *B01D 46/0075* (2013.01); *F24F 13/28* (2013.01); *F24F 2001/0037* (2013.01); *F24F 2003/1639* (2013.01)

(58) Field of Classification Search
CPC . F24F 2001/0096; F24F 13/085; F24F 13/28; F24F 2003/008; F24F 2003/1603–2003/1607; F24F 2001/0037; F24F 2003/1639; F24F 1/0007; F24F 3/1614; F24F 3/1639; B01D 24/4673; B01D 29/0061; B01D 29/0086; B01D 29/72; B01D 25/346; B01D 33/0083; B01D 33/03; B01D 33/54; B01D 46/0053; B01D 46/0075; B01D 35/54; B01D 35/20; B01D 46/0076; B01D 2279/50
USPC ................... 95/1–24, 273–287; 55/282–305
See application file for complete search history.

(56) References Cited

U.S. PATENT DOCUMENTS

| | | | | |
|---|---|---|---|---|
| 3,333,401 A | * | 8/1967 | Abboud | 55/293 |
| 2004/0000160 A1 | * | 1/2004 | Takashima et al. | 62/317 |
| 2006/0070358 A1 | * | 4/2006 | Oda et al. | 55/295 |
| 2007/0000219 A1 | | 1/2007 | Park et al. | |
| 2010/0043362 A1 | * | 2/2010 | Okada et al. | 55/296 |
| 2010/0258267 A1 | * | 10/2010 | Sakashita et al. | 165/59 |
| 2011/0299043 A1 | * | 12/2011 | Nishihata et al. | 353/52 |

FOREIGN PATENT DOCUMENTS

| | | |
|---|---|---|
| JP | 10-009660 | 1/1998 |
| JP | 2010286142 A * | 12/2010 |
| KR | 10-0811657 | 3/2008 |

OTHER PUBLICATIONS

European Search Report dated Jul. 2, 2014.

* cited by examiner

*Primary Examiner* — Thomas McKenzie
(74) *Attorney, Agent, or Firm* — Ked & Associates LLP

(57) ABSTRACT

Provided are an air-conditioner and a controlling method thereof. The air-conditioner includes a blower fan forcibly generating a flow of air, a filter disposed on a flow path of the air that forcibly flows by the blower fan, and a vibration actuator disposed on a side of the filter. The method for controlling an air-conditioner includes disposing a collection part under a filter of an air-conditioner, vibrating a vibration actuator disposed on a side of the filter, and separating the collection part from a lower side of the filter.

14 Claims, 6 Drawing Sheets

AIR-CONDITIONER AND CONTROLLING METHOD THEREOF

CROSS-REFERENCE TO RELATED APPLICATIONS

The present application claims priority under 35 U.S.C. 119 and 35 U.S.C. 365 to Korean Patent Application No. 10-2013-0012676 (filed on Feb. 5, 2013), which is hereby incorporated by reference in its entirety.

BACKGROUND

The present disclosure relates to an air-conditioner and a controlling method thereof.

Air-conditioners are home appliances that maintain indoor air into the most proper state according to use and purpose thereof. For example, such an air-conditioner controls indoor air into a cold state in summer and controls indoor air into a warm state in winter. Furthermore, the air-conditioner controls humidity of the indoor air and purifies the indoor air to become into a pleasant and clean state.

Air-conditioners may have a refrigeration cycle constituted by a compressor, a condenser, an expansion device, an evaporator, and a circulation tube. The circulation tube connects the compressor, the condenser, the expansion device, and the evaporator to each other and guides a refrigerant flowing into the circulation tube.

Such an air-conditioner includes a suction part for suctioning air within an indoor space, a heat exchanger heat-exchanged with the air suctioned through the suction part, and a discharge part for discharging the air heat-exchanged in the heat exchanger into the indoor space. A filter for filtering foreign substances from the suctioned air is disposed between the suction part and the discharge part. When dusts are collected in the filter, the air conditioner may be reduced in air-conditioning performance. Therefore, the filter needs to be regularly cleaned up.

An air-conditioner disclosed in Korean Patent Publication No. 10-2007-0095524 includes a suction nozzle capable of removing dusts while moving in a predetermined direction, a dust collection part capable of collecting dusts moving through the suction nozzle, and a motor configured to move the dusts through the suction nozzle.

The air-conditioner according to the related art has a limitation in that serious noises occur during the suction of the dusts.

Also, since the suction nozzle, dust collection part, and the motor needs to be separately provided, the air-conditioner may increase in volume, be completed in manufacturing process due to increase in number of components, and increase in manufacturing cost and effort.

In addition, the air-conditioner has a limitation in that the dusts separated from the filter during an operation of the brush are scattered to cause breakdown of peripheral components or to fall down to a user.

SUMMARY

Embodiments provide an air-conditioner and a controlling method thereof.

In one embodiment, an air-conditioner includes: a blower fan forcibly generating a flow of air; a filter disposed on a flow path of the air that forcibly flows by the blower fan; and a vibration actuator disposed on a side of the filter.

In another embodiment, a method for controlling an air-conditioner includes: disposing a collection part under a filter of an air-conditioner; vibrating a vibration actuator disposed on a side of the filter; and separating the collection part from a lower side of the filter.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Figure 1:
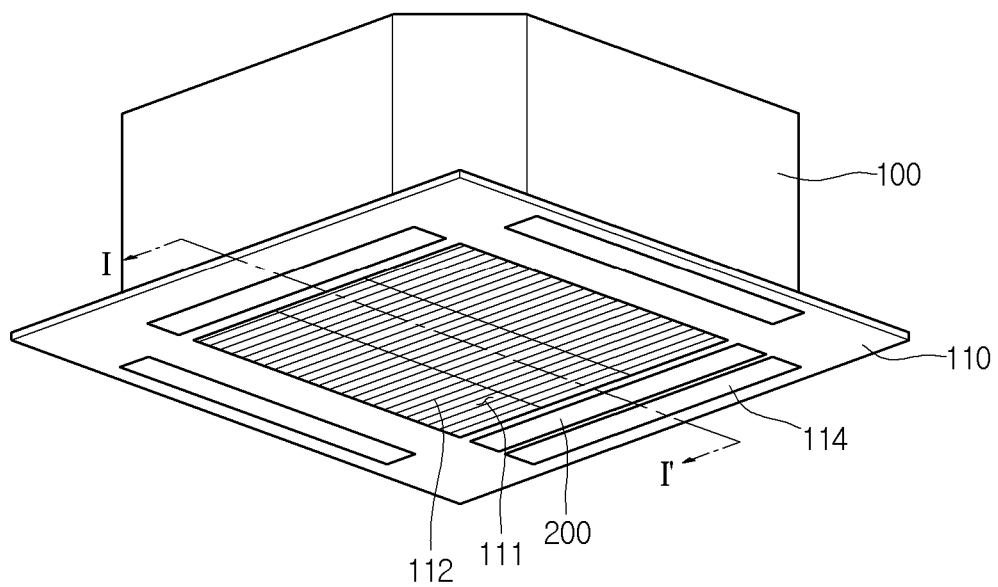
FIG. 1 is a bottom perspective view of an air-conditioner according to an embodiment.

FIG. 1 is a bottom perspective view of an air-conditioner according to an embodiment.

Referring to FIG. 1, an air-conditioner 10 according to an embodiment may include a body 100 defining an outer appearance, a front panel disposed on a front surface of the body 100, and a dust disposal unit 200 disposed on one side of the front panel 110.

A plurality of components for air-conditioning may be disposed in the body 100.

The front panel 110 may include a suction hole 111, a suction panel 112 disposed on the suction hole 111, a discharge hole 113 (see FIG. 2), and a discharge vane 114 disposed on the discharge hole 113.

If the air-conditioner 10 is a ceiling type air-conditioner, the front panel 110 may be disposed on a bottom surface of the body 100. The suction hole 111 may be defined at a central portion of the front panel 110, and the discharge hole 113 may be defined in an edge portion of the front panel 110, which is spaced apart from the suction hole 111.

Hereinafter, the dust disposal unit 200 will be described in detail with reference to FIGS. 2 and 3.

Figure 2:
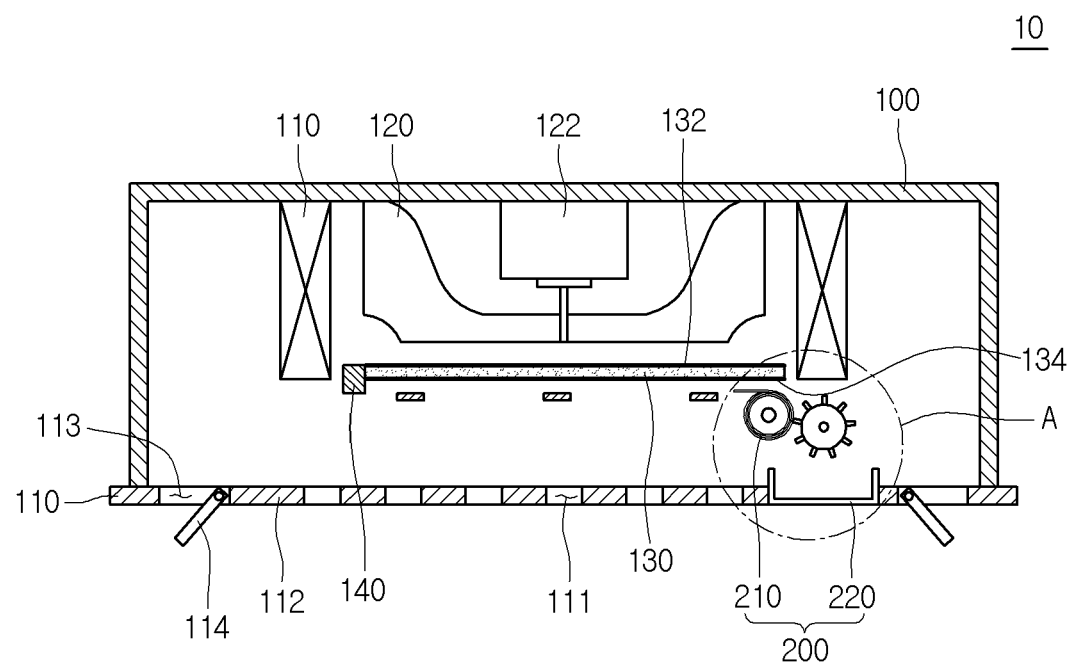
FIG. 2 is a cross-sectional view taken along line I-I' of FIG. 1.
Figure 3:
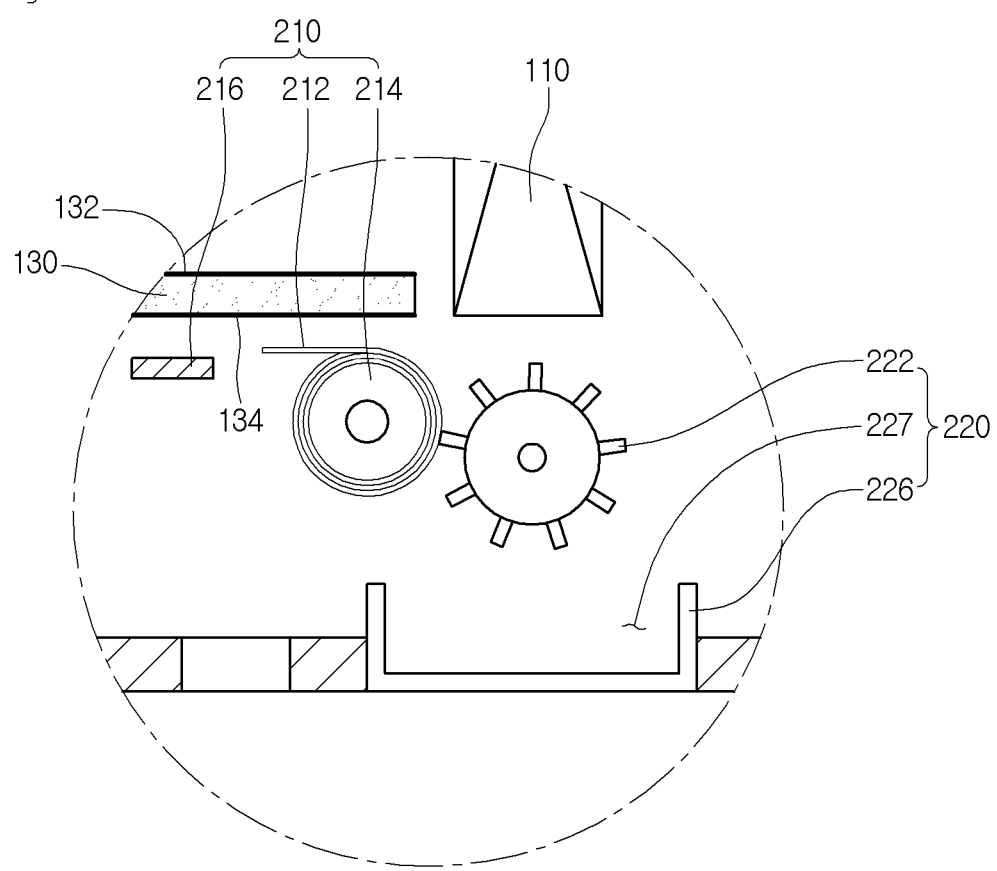
FIG. 3 is a partially enlarged view of a portion A of FIG. 2.

FIG. 2 is a cross-sectional view taken along line I-I' of FIG. 1, and FIG. 3 is a partially enlarged view of a portion A of FIG. 2.

Referring to FIGS. 2 and 3, the body 100 may include a heat exchanger 110, a blower fan 120 disposed on one side of the heat exchanger 110, a blower motor 122 driving the blower fan 120, a filter 130 for filtering foreign substances contained in air flowing in the body 100, and a vibration actuator 140 disposed on one side of the filter 130 therein.

The heat exchanger 110 allows the air passing through the heat exchanger 110 to heat-exchange with a refrigerant flowing in the heat exchanger 110.

The blower fan 120 may be connected to the blower motor 122 to rotate according to rotation of the blower motor 130. The blower fan 120 allows the air to flow so that the air passes through the heat exchanger 110. The blower fan 120 may suction the air from the suction hole 111 defined under the blower fan 120 to discharge the air through the discharge hole 113. The blower fan 120 may be a centrifugal fan or a mixed flow fan. However, the present disclosure is not limited to a kind of blower fan 120.

The filter 130 is disposed on a flow path of the air forcibly flowing by the blower fan 120. That is, the filter unit 130 may be disposed between the suction hole 111 and the discharge hole 113. The filter 130 may be disposed to cross the flow path of the air. The filter 130 may be disposed in a direction perpendicular to a flow direction of the air. The filter 130 may be disposed on at least one of suctioning and discharging sides of the air. For example, as shown in FIG. 2, the filter 130 may be disposed between the blower fan 120 and the suction hole 111 to filter the foreign substances from the air suctioned into the blower fan 120. The filter 130 may have a side fixed to the inside of the body 100.

The filter 130 may include at least one or more antistatic coating layers 132 and 134. The antistatic coating layers 132 and 134 may include a first coating layer 132 disposed on one surface of the filter 130 and a second coating layer 134 disposed on the other surface of the filter 130. The coating layer may prevent a phenomenon in which dusts separated from the filter 130 are attached to the filter 130 by static electricity from occurring.

The vibration actuator 140 may vibrate the filter 130 to separate the dusts attached the filter 130. For example, the vibration actuator 140 may be fixed to a side of the filter 130. For example, the vibration actuator 140 may be fixed on one side surface of the filter 130. The vibration actuator 140 may be an ultrasonic vibrator generating vibration by ultrasonic waves. The vibration actuator 140 may vibrate the filter 130 in the same direction as the flow direction of the air passing through the filter 130. In case of FIG. 3, the vibration actuator 140 may vertically vibrate the filter 130. However, the vibrating direction of the vibration actuator 140 is not limited to the above-described direction.

The dust disposal unit 200 may remove the dusts separated from the filter 130 by the vibration actuator 140. The dust disposal unit 200 may include a dust collection unit 210 and a dust recovery unit 220.

The dust collection unit 210 may include a collection part 212, a collection roller 214 driving the collection part 212, and a collection part guide 216 for guiding movement of the collection part 212.

The collection part 212 may function as a collector for collecting the dusts falling down from the filter 130. The collection part 212 may be formed of a flexible material. For example, the collection part 212 may be formed of a fiber material.

The collection part 212 may be selectively wound around the collection roller 214 or be unwound from the collection roller 214. When the collection part 212 is unwound from the collection roller 214, the collection part 212 may be disposed under the filter 140 in a state where the collection part 212 is spread. When the collection part 212 is completely unwound from the collection roller 214, the collection part 212 may overlap the filter 140 in a direction perpendicular to the ground. That is, the collection part 212 may selectively overlap the filter 140 in a vertical direction.

For example, in case of ceiling type air-conditioner illustrated in the figures, the filter 130 and the collection part 212 may be horizontally disposed with respect to the ground. In this case, the collection part 212 may have a width equal to or greater than that of the filter 130. Thus, the all dusts separated from the filter 130 may be collected into the collection part 212 by gravity.

The collection part 212 may be wound around an outer circumferential surface of the collection roller 214. The collection roller 214 may be disposed on an edge of the filter 140.

According to a rotation direction of the collection roller 214, the collection part 212 may be spread to a lower side of the filter 130 or return to its original position. For example, when the collection roller 214 rotates in a clockwise direction, the collection part 212 may be recovered from the lower side of the filter 130 to return its original position while winding around the collection roller 214. The collection roller 214 may rewind the collection part 212 in a state where a top surface of the collection part 212 faces the outside. When the collection roller 214 rotates in a counterclockwise direction, the collection part 212 may be spread to the lower side of the filter 130 while being unwound from the collection roller 214.

That is, the collection roller 214 may rotate in one direction to allow the collection part 212 to vertically overlap the filter 130, and the collection roller 214 may rotate in the other direction to prevent the collection part 212 from vertically overlapping the filter 130.

When the collection part 212 is spread, the collection part guide 216 may support the collection part 212. When the collection part 212 vertically overlaps the filter 130, the collection part guide 216 may support the collection part 212.

The collection part guide 216 may be fixed to the inside of the body 100. The collection part guide 216 may prevent the spread collection part 212 from being drooped down.

The dust recovery part 220 may include a brush 222 and a dust recovery box 226 for recovering dusts falling down from the collection part 212.

The brush 222 may separate dusts collected in the collection part 212. The brush 222 may be disposed on a side of the collection part 212 to contact one surface of the collection part 212. For example, the brush 222 may be disposed on a side of the collection roller 214. When the collection roller 214 rotates, the brush 222 may contact the one surface of the collection part 212 moving between the collection roller 214 and the brush 222 to generate friction. Due to the friction, the dusts collected in the collection part 212 may be separated from the collection part 212. The brush 222 may be rotatably disposed.

The recovery box 226 may receive the dusts separated by the brush 222. The recovery box 226 may include a dust receiving space 227 recessed downward from an upper side. The dust receiving space 227 may perpendicularly overlap a portion at which the brush 222 is in contact with the collection part 212. The recovery box 226 may be detachably disposed on the air-conditioner 10.

For example, the recovery box 226 may be detachably disposed on the body 100. In detail, the recovery box 226 may be coupled to the front panel 110 in a hook or hinge manner. However, the present disclosure is not limited to the position and coupling method of the recovery box 226.

Figure 4:
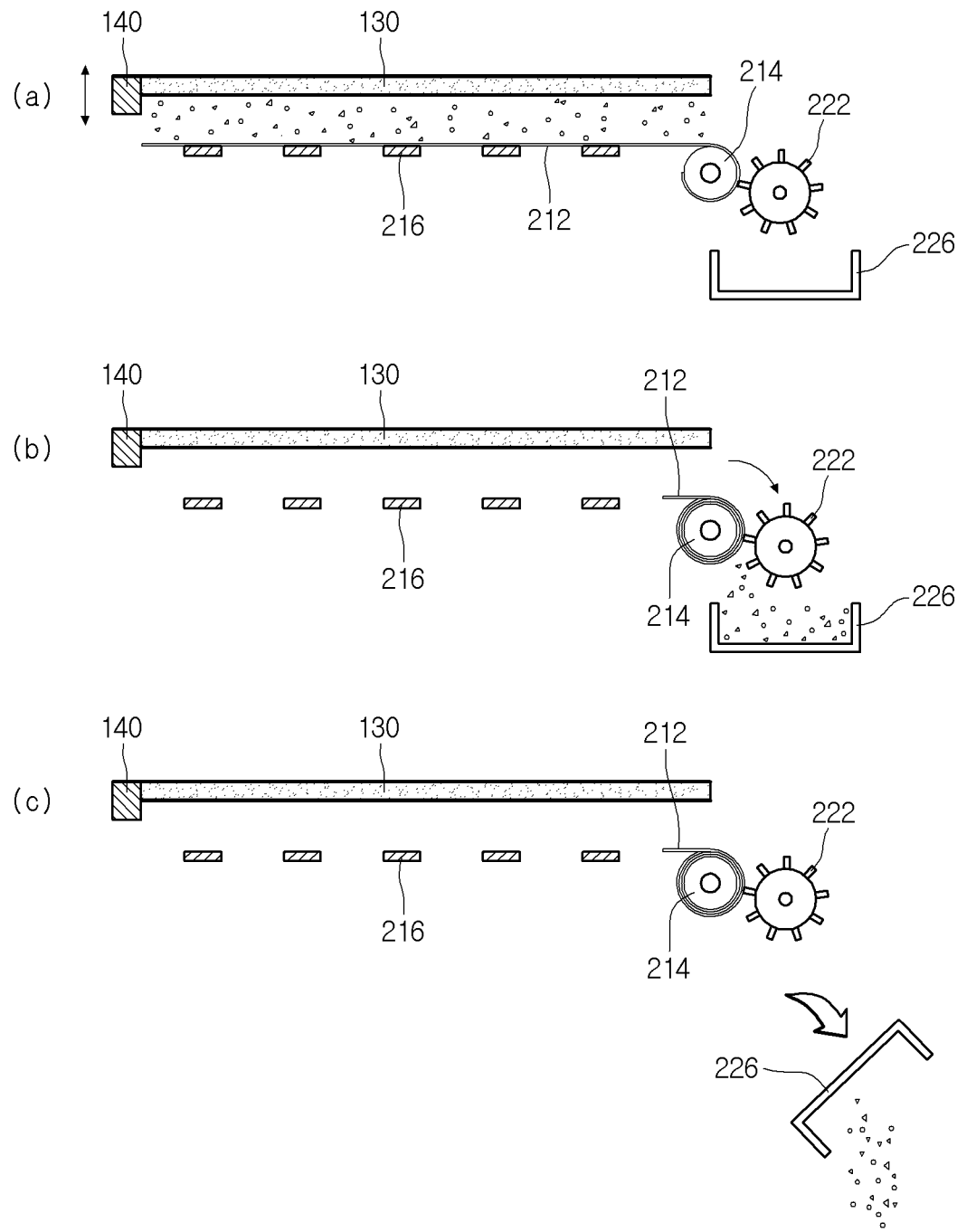
FIG. 4 is a view illustrating an operation of a dust disposal unit according to an embodiment.

FIG. 4 is a view illustrating an operation of a dust disposal unit according to an embodiment.

An operating of the dust disposal unit 200 will be described herein with reference to FIG. 4.

First, referring to FIG. 4A, when the collection roller 214 rotates in one direction, the collection part 212 is disposed under the filter 130 in a state where the collection part 212 is spread. The vibration actuator 140 vibrates the filter 130. In this case, dusts separated from the filter 130 are collected on the top surface of the collection part 212. This process may be called a "dust collection mode"

Then, referring to FIG. 4B, when the cleaning of the filter 130 is finished, the operation of the vibration actuator 140 is stopped. The collection roller 214 rotates in the other direction to recover the collection part 212. The collection roller 214 may recover the collection part 212 so that the top surface of the collection part 212 faces the outside. In this case, the collection part 212 is wound in a state where the top surface thereof is in contact with the brush 222. Thus, the dusts collected on the top surface of the collection part 212 may be separated by the brush 222. The separated dusts may be recovered to the recovery box 226. That is, while the collection roller 214 recovers the collection part 212, the dusts of the collection part 212 may be recovered into the recovery box 226. Thus, the collection part 212 on which dusts are not collected may be wound around the collection roller 214. This process may be called a "dust recovery mode"

Lastly, referring to FIG. 4C, the dusts collected in the recovery box 226 may be removed by detaching and emptying the recovery box 226.

Figure 5:
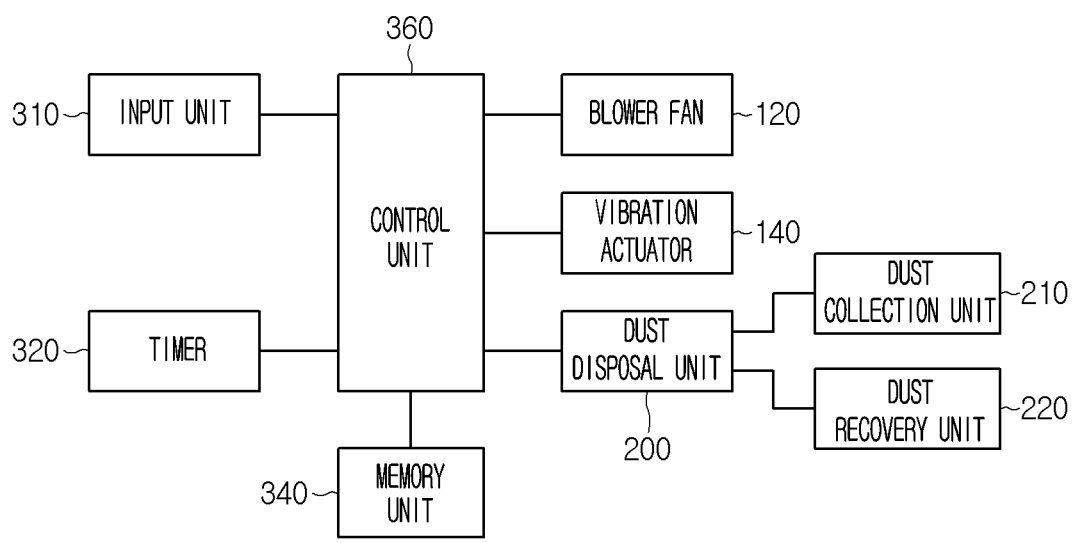
FIG. 5 is a block diagram of an air-conditioner according to an embodiment.

FIG. 5 is a block diagram of an air-conditioner according to an embodiment.

Referring to FIG. 5, the air-conditioner 10 according to an embodiment may further include an input unit 310 for receiving an operation command of the dust disposal unit 200, a timer 320 for measuring a time related to driving of the air-conditioner 10, a memory unit 340 for storing information related to the driving of the air-conditioner 10, and a control unit 360 for controlling the operation of the air-conditioner 10.

The input unit 310 may be disposed on the front panel 110 or the body 100. Also, the input unit 310 may be disposed on a remote controller that is separately provided. A user may input a filter cleaning command of the air-conditioner 10 through the input unit 310.

The timer 320 may accumulate and measure a driving time of the air-conditioner 10. When the cleaning of the filter in the air-conditioner 10 is finished, the timer 320 may be initialized. That is, the timer 320 may newly accumulate and measure a driving time of the air-conditioner 10.

A 'set-up time' for determining the operation of the dust disposal unit 200 may be stored in the memory unit 340.

The control unit 360 may control operations of the blower fan 120, the vibration actuator 140, and the dust disposal unit 200 on the basis of information detected from the input unit 310 and the timer 320 and the information stored in the memory unit 340.

Figure 6:
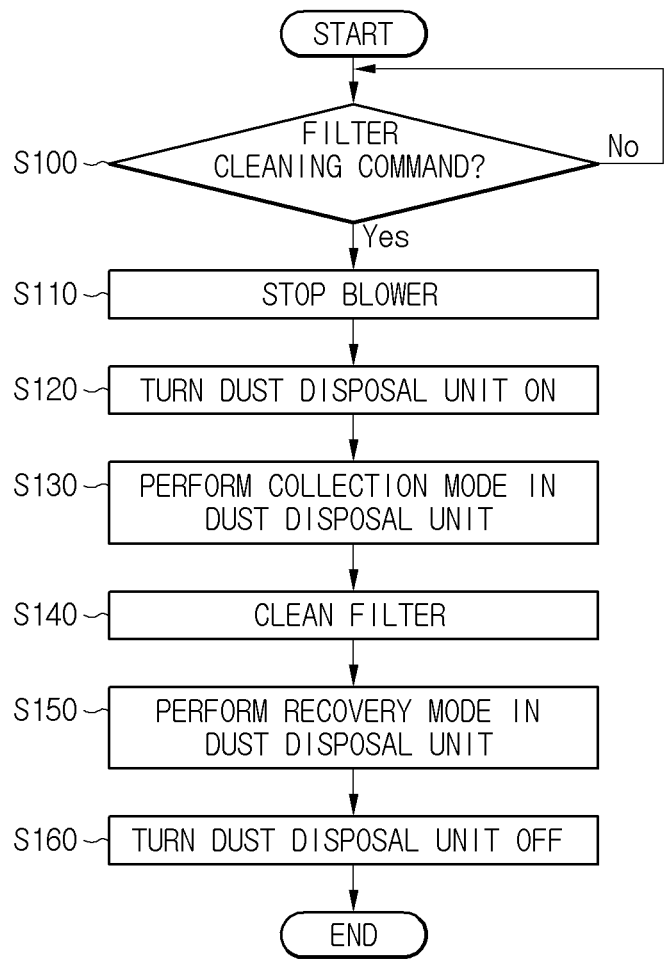
FIG. 6 is a flowchart illustrating a control method of an air-conditioner according to an embodiment.

FIG. 6 is a flowchart illustrating a control method of an air-conditioner according to an embodiment.

Referring to FIG. 6, in operation S100, it is determined whether a filter cleaning command is recognized by the air-conditioner 10. Here, the case in which the filter cleaning command is recognized may be, for example, a case in which the filter cleaning command is separately input through the input unit 310. For another example, the case may be a case in which the driving time of the air-conditioner 10 measured by the timer 320 exceeds the set-up time.

When the filter cleaning command is recognized in the operation S100, the control unit 360 may stop an air conditioning function of the air-conditioner 10. For example, the control unit 360 may stop an operation of the blower fan 120.

The dust disposal unit 200 is turned on in operation S120, and the dust disposal unit 200 performs the dust collection mode in operation S130. That is, the control unit 360 may rotate the collection roller 214 to spread the collection part 212 to the lower side of the filter 130.

In operation S140, when the collection part 212 is completely spread out, the filter 130 may perform cleaning. In detail, the control unit 360 may vibrate the vibration actuator 140 to vibrate the filter 130. Due to the vibration of the filter 130, the dusts are separated from the filter 130, and then the separated dusts are collected on the top surface of the collection part 212. The vibration actuator 140 may operate for a predetermined time or a time desired by the user.

In operation S150, when the operation of the vibration actuator 140 is stopped, the dust disposal unit 200 performs the recovery mode. That is, the control unit 360 may rotate the collection roller 214 to rewind the collection part 212 around the collection roller 214. That is to say, the collection part 212 may be separated from the lower side of the filter 130.

Here, the control unit 360 may control the collection part 212 so that the collection part 212 is wound around to allow the top surface thereof to faces the outside. While the collection part 212 is recovered, the brush 222 may separate the dusts collected on the top surface of the collection part 212. The separated dusts may be recovered into the recovery box 226. That is, the operation for recovering the collection part 212 and the operations for separating the dusts collected on the collection part 212 and recovering the collected dusts into the dust recovery box 226 may be simultaneously performed.

In operation S160, when the collection part 212 is completely wound, the dust disposal unit 200 may be turned off, the filter cleaning may be stopped, and the air-conditioner 10 may operate to its original air conditioning mode.

According to the air-conditioner of the embodiment, the cleaning of the filter may be performed by using the vibration actuator to reduce noises. Furthermore, the cleaning of the filter may be performed by using the vibration actuator having a relatively small volume to reduce a volume of an air-conditioner having an automatic filter cleaning function. In addition, the dusts generated while the filter is cleaned may be collected to prevent the dusts from being scattered into the components or the indoor space. Also, the collected dusts may be easily removed by using the dust recovery box to improve convenience of use.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air-conditioner, comprising:
   a blower fan that generates a flow of air;
   a filter disposed in a flow path of the air that flows due to the blower fan;
   a vibration actuator disposed at a first end of the filter, that vibrates the filter to separate dust from the filter;

a collection part disposed under the filter to collect the dust separated from the filter by the vibration of the filter;

a plurality of collection part guides disposed under the filter to guide movement of the collection part;

a collection roller that selectively winds or unwinds the collection part onto or off of the collection roller according to a rotational direction of the collection roller;

a brush disposed adjacent to a side of the collection roller to contact one surface of the collection part wound onto the collection roller; and a recovery box disposed under the collection roller and having a dust receiving space to receive the dust separated from the collection part, wherein the plurality of collection part guides is spaced a predetermined distance from each other in a longitudinal direction of the filter, wherein, when the brush contacts the one surface of the collection part while the collection roller rotates, dust on the collection part is removed from the collection part, and wherein the removed dust is collected into the recovery box.

2. The air-conditioner according to claim 1, wherein the collection part selectively overlaps the filter in a vertical direction.

3. The air-conditioner according to claim 2, wherein the collection part is formed of a flexible material.

4. The air-conditioner according to claim 3, wherein the collection roller rotates in a first direction to allow the collection part to vertically overlap the filter, and wherein the collection roller rotates in a second direction to prevent the collection part from vertically overlapping the filter.

5. The air-conditioner according to claim 4, wherein the collection roller recovers the collection part so that a top surface of the collection part faces outside.

6. The air-conditioner according to claim 1, wherein the recovery box is detachably disposed on a front panel.

7. The air-conditioner according to claim 1, wherein a portion at which the brush contacts the collection part vertically overlaps the dust receiving space.

8. The air-conditioner according to claim 1, wherein the vibration actuator is an ultrasonic vibrator.

9. The air-conditioner according to claim 1, wherein the filter comprises an antistatic coating layer.

10. The air-conditioner according to claim 2, wherein each of the filter and the collection part is disposed in parallel with the ground, and wherein the collection part has a width equal to or greater than that of the filter.

11. The air-conditioner according to claim 2, further comprising:

a body comprising the blower fan, the filter, and the vibration actuator therein;

a front panel disposed on a bottom surface of the body; and a suction hole defined in the front panel, wherein the filter is disposed above the suction hole, and wherein the collection part is disposed between the filter and the suction hole.

12. The air-conditioner according to claim 11, wherein the plurality of collection part guides is fixed to an inside of the body.

13. The air-conditioner according to claim 1, wherein the plurality of collection part guides is disposed under the collection part when the collection part is in an unwound state.

14. The air-conditioner according to claim 3, wherein the collection roller is disposed adjacent a second end of the filter.

* * * * *